Tucker & Palmer,
Water Wheel,

Nº 83,009. Patented Oct. 13, 1868.

Witnesses.
Georg. Ruhlandt
H. F. Eberk

Inventors
J. Tucker
A. B. Palmer
Per Attorney
Thos. S. Sprague

United States Patent Office.

JESSE TUCKER AND ABEL B. PALMER, OF ADRIAN, MICHIGAN.

Letters Patent No. 83,009, dated October 13, 1868.

IMPROVEMENT IN WATER-WHEELS.

The Schedule referred to in these Letters Patent and making part of the same

*To whom it may concern:*

Be it known that we, JESSE TUCKER and ABEL B. PALMER, of Adrian, in the county of Lenawee, and State of Michigan, have invented a new and useful Improvement in Turbine Water-Wheels; and we do declare that the following is a true and accurate description thereof, reference being had to the accompanying drawings, and to the letters of reference marked thereon, and being a part of this specification.

Like letters indicate like parts in the several figures.

The nature of our invention consists in providing a water-wheel, having a bottom and side issue, with an auxiliary series of buckets, as hereinafter described.

Figure 1:
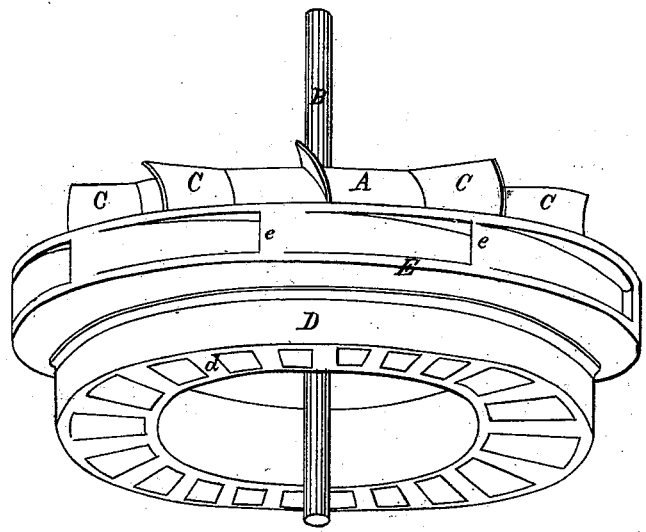
Figure 1 is a perspective view of our improved water-wheel.
Figure 2:
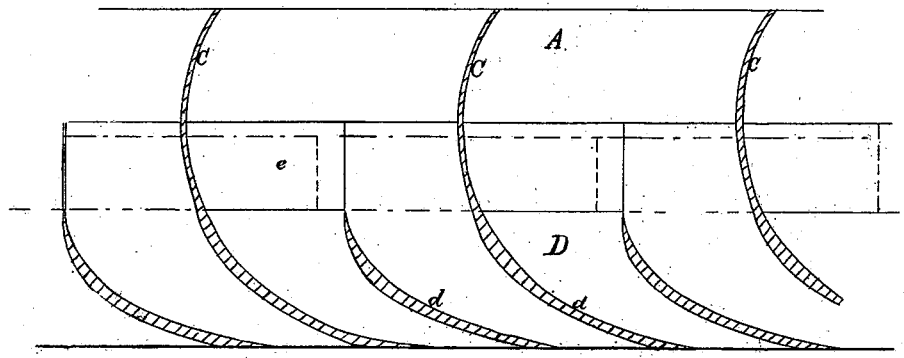
Figure 2 is a vertical section of the same, showing the relative position of the buckets.

A, in the drawings, is a drum upon the shaft B, provided with buckets, C, curved, as shown in fig. 2. D is the lower part of the wheel, having a series of inclined buckets, d, and E is the upper part, projecting outwardly over the lower part D, and is provided with a series of outward-discharging buckets, e.

The buckets C extend upward from the top of buckets d, their lower portions being within and on a level with buckets e, and their upper portions projecting above buckets e, to receive the water as it first enters the wheel.

The water enters above the part E, through orifices in the curb, and strikes directly upon the buckets C, and then, acting upon the buckets d and e, gives increased impetus to the wheel.

Having thus described our invention,

What we claim as new, and desire to secure by Letters Patent, is—

A water-wheel, having three series of buckets C, d, and e, constructed as shown, and arranged in relation to each other, substantially as and for the purposes set forth.

JESSE TUCKER.
ABEL B. PALMER.

Witnesses:
H. F. EBERTS,
G. C. HYDE.